Patented July 21, 1925.

1,547,111

UNITED STATES PATENT OFFICE.

ALFRED N. FINN, OF WASHINGTON, DISTRICT OF COLUMBIA, ASSIGNOR OF ONE-HALF TO LLOYD L. EVANS, OF CLEVELAND, OHIO.

WATER PURIFICATION.

No Drawing.      Application filed January 19, 1923. Serial No. 613,758.

*To all whom it may concern:*

Be it known that I, ALFRED N. FINN, a citizen of the United States, residing at Washington, in the District of Columbia, have invented a certain new and useful Improvement in Water Purification, of which the following is a full, clear, and exact description.

This invention relates to the art of purifying or softening water, such as natural waters for industrial uses in boilers, laundries, textile and paper industries, and other industries where salts other than salts of the alkali metals are objectionable and it consists in treating the water before it is to be used to remove the objectionable mineral matter.

An object of this invention is to so treat the water that practically all the salts in solution having objectionable qualities are removed before the water is used.

Another object of this invention is to treat the water with such chemicals that substantially all the objectionable ingredients are removed and yet the water cannot be over-treated, that is—cannot take up any substantial amount of the chemicals with which it is treated.

A further object of the invention is to provide a simple and easy method of treating natural waters which is relatively inexpensive in its operation.

Another characteristic of the invention is that water treated according to my process will have substantially all of the suspended matter removed.

It has heretofore been proposed to treat water by soda ash and lime which will remove a substantial portion of the alkaline earth metals, substituting their equivalents in alkali metals, but according to my process it is possible to remove substantially all the alkaline earth metals and to remove the sulphuric acid radical of substantially all the sulphate salts whether they be salts of the alkaline earth or alkali metals.

In treating water according to my process one may proceed with the two steps of the reaction by carrying them out simultaneously or in optional succession, depending upon the conditions and circumstances under which the process is being operated, as will appear more fully hereinafter, but I will first describe these steps of the process individually.

To remove the bicarbonates or temporary hardness first, I treat the water by filtering it through a filter containing an excess of magnesium oxide, hydroxide, or its equivalent, to react with the bicarbonates, transforming them into the respective carbonates. Or if it be desired, the magnesium oxide or its equivalent can be added and the water agitated and the precipitate removed.

For each molecule transformed, one molecule of magnesium carbonate is formed from the magnesia or its equivalent according to the following equations:

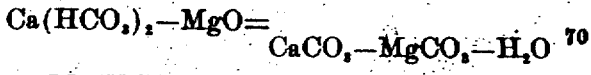

The calcium and magnesium carbonates formed from their respective bicarbonates and from the magnesia involved in this reaction are relatively insoluble and therefore form precipitates. If there be any sodium bicarbonate present in the water, it forms magnesium carbonate and sodium hydroxide and perhaps some sodium carbonate because the reactions may not go to completion, both of which being soluble are retained in solution. If there be any bicarbonates, such as those of iron or aluminum, they are also precipitated and removed during this step of the process.

In treating the water to remove the sulphates usually occurring in natural water I desire to use an alkaline earth carbonate, preferably in excess, such, for example, as barium carbonate which reacts with the sulphates in solution to form barium sulphate and the respective carbonates of the metals previously existing as a sulphate. Such sulphates usually are calcium, magnesium or sodium sulphates. In the case of the calcium and magnesium sulphates, the barium carbonate reacts to form barium sulphate and calcium and magnesium carbonates, all of which are relatively insoluble and are precipitated. These reactions take place according to the following equations:

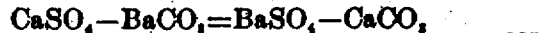

In the case of sodium sulphate, the reaction forms barium sulphate which is relatively insoluble and sodium carbonate which remains in solution.

The majority of waters to be treated contain only normal amounts of bicarbonates with variable amounts of sulphates and with these either treatment can be used first but preferably the barium carbonate. If, however, the water to be treated contains more carbon dioxide in solution than normal surface waters, it may be preferable to treat this water with the magnesium compound first. This is because the excess carbon dioxide in solution would tend to dissolve a relatively larger amount of barium carbonate, which even though small is usually undesirable and it would have to be removed later. Also, if the water to be treated is to be agitated with the added chemical instead of filtered through a bed containing it and if the water is of such a nature that it is more desirable to treat with the barium carbonate in the second step, this second step should be carried out in an atmosphere having no carbon dioxide because its presence will cause a partial solution of the barium carbonate and this is objectionable for some purposes.

If the water to be treated contains large amounts of sulphates in solution, it is preferable to treat it with the barium carbonate first in order to precipitate a larger quantity of salts first, also because it has been found that the sulphates are more readily precipitated while bicarbonates are still present.

In order to get the best results the magnesium oxide should be prepared with special reference to the fineness and temperature of burning, as is well understood, so that it will be active chemically when added for treatment. The barium carbonate used in connection with the reaction with the sulphates is a product now obtainable in commercial quantities on the market.

The small amounts of sodium carbonate and hydroxide which remain in solution as a result of the reactions, render the solution slightly alkaline and this is not only not injurious for most purposes, but is actually beneficial to boilers, valves, pipes, etc., of the system where it is used.

It may be noted that the chemicals added for treatment may be added to the water and the water agitated to ensure complete reactions, or the water may be run through suitable filters containing the chemicals for treatment. In the former case the precipitated material may be removed by filtration or sedimentation and in the latter case the precipitates will be removed as formed. In either case the suspended matter in the water comes down with the precipitate and is removed at the same time.

It will also be noticed that in treating water according to my process that one does not need to be careful about the amount of magnesium or barium salts added except that there must be a sufficient minimum amount to properly react with the salts in solution. This is because an excess of the added materials can not increase the soluble mineral contents of the water but they are substantially reduced after treating with my process.

Attention is also directed to the fact that in removing the bicarbonates and sulphates substantially all the scale forming compounds are removed, so that my process may be operated to advantage in treating waters for use in boilers, as well as for many other industrial applications and uses.

It will be seen, also, that my process presents a simple, cheap and efficient method of treating in large quantities a large variety of natural waters. These waters may be treated at their source, or where they are wanted for use, without a large investment in a plant and yet the treated water will be free from all objectionable mineral contents.

It may also be noted that for waters in which a relatively small quantity of the bicarbonates and sulphates occur that the treating agents employed may be used to react simultaneously with the salts occurring in the water and the resulting precipitates removed.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

Having described my invention, what I claim is:

1. The process of softening water which consists in treating it with an alkaline earth oxide, capable of decomposing bicarbonates and with a carbonate capable of precipitating sulphates and reacting with alkali salts to transform them into alkali carbonates.

2. The process of purifying water which consists in treating the water with a carbonate capable of reacting with the sulphates to form relatively insoluble precipitates and with an oxide capable of reacting with bicarbonates and removing the precipitates from the solution.

3. The process of purifying water which consists in treating it with a compound capable of reacting with bicarbonates and with a carbonate capable of reacting with alkaline earth sulphates to form relatively insoluble sulphates and carbonates, and removing the insoluble compounds from the solution.

4. The process of purifying water for boilers which consists in treating it with a compound capable of reacting with alkaline earth bicarbonates to form relatively insoluble carbonates, and with a carbonate capable of reacting with alkaline earth sulphates to form relatively insoluble sulphates, and reacting with alkali sulphates to precipitate insoluble sulphates and form alkali carbonates, thereby precipitating substantially all objectionable mineral compounds.

5. The process of softening water which consists in treating it with an oxide capable of reacting with bicarbonates, other than alkali bicarbonates, to form relatively insoluble carbonates and treating with an alkaline earth carbonate capable of reacting with sulphates in the water, other than alkali sulphates, forming relatively insoluble carbonates and insoluble sulphates and removing such precipitates from the water.

6. The process of purifying water which consists in treating it with an alkaline earth carbonate to react with alkaline earth sulphates to form relatively insoluble sulphates and with an alkaline earth oxide capable of reacting with alkaline earth bicarbonates to form relatively insoluble carbonates and removing such relatively insoluble compounds.

7. The process of purifying water for boilers and the like which consists in treating it with magnesium oxide and an alkaline earth carbonate to react with the bicarbonates and sulphates in solution, forming relatively insoluble alkaline earth carbonates and sulphates, said magnesium oxide and alkaline earth carbonate also reacting with alkali bicarbonates and sulphates to form alkali carbonates and hydroxides.

8. The process of softening water which consists in treating it with magnesium oxide and barium carbonate, the magnesium oxide reacting with alkaline earth bicarbonates to form relatively insoluble alkaline earth carbonates in water, and reacting with alkali bicarbonates to form alkali carbonates and hydroxides, said barium carbonate reacting with alkaline earth sulphates to form barium sulphate and alkaline earth carbonates, and also reacting with alkali sulphates to form barium sulphate, and removing the relatively insoluble precipitates from the water.

9. The process of purifying water which consists in treating it with an alkaline earth carbonate in excess to form relatively insoluble alkaline earth sulphates and alkali carbonates and treating it with magnesium oxide in excess to react with the bicarbonates to form relatively insoluble carbonates.

10. The process of purifying water which consists in treating it in optional succession with milk of magnesia in excess to react with the bicarbonates to form relatively insoluble carbonates and with barium carbonate in excess to form relatively insoluble alkaline earth sulphates.

11. The process of purifying water which consists in treating it with milk of magnesia and barium carbonate, both in excess, and removing the precipitates.

12. The process of purifying water which consists in removing the acid radical of all the sulphate salts in the water, decomposing the bicarbonates in the water and removing substantially all the carbonates by treating with barium carbonate and milk of magnesia and removing the precipitates formed.

13. The process of purifying water which consists in removing from the water the salts of heavy metals and the sulphates by treating the water with an oxide and with an alkaline earth carbonate and removing the precipitates formed.

14. The process of purifying water for boilers and the like which consists in treating it with magnesium oxide and barium carbonate to react with the bicarbonates and sulphates in solution, forming relatively insoluble alkaline earth carbonates and sulphates and filtering the water to remove the precipitates and suspended matter, whereby substantially all the scale forming compounds are removed.

In testimony whereof, I hereunto affix my signature.

ALFRED N. FINN.

of reacting with alkaline earth sulphates to form relatively insoluble sulphates, and reacting with alkali sulphates to precipitate insoluble sulphates and form alkali carbonates, thereby precipitating substantially all objectionable mineral compounds.

5. The process of softening water which consists in treating it with an oxide capable of reacting with bicarbonates, other than alkali bicarbonates, to form relatively insoluble carbonates and treating with an alkaline earth carbonate capable of reacting with sulphates in the water, other than alkali sulphates, forming relatively insoluble carbonates and insoluble sulphates and removing such precipitates from the water.

6. The process of purifying water which consists in treating it with an alkaline earth carbonate to react with alkaline earth sulphates to form relatively insoluble sulphates and with an alkaline earth oxide capable of reacting with alkaline earth bicarbonates to form relatively insoluble carbonates and removing such relatively insoluble compounds.

7. The process of purifying water for boilers and the like which consists in treating it with magnesium oxide and an alkaline earth carbonate to react with the bicarbonates and sulphates in solution, forming relatively insoluble alkaline earth carbonates and sulphates, said magnesium oxide and alkaline earth carbonate also reacting with alkali bicarbonates and sulphates to form alkali carbonates and hydroxides.

8. The process of softening water which consists in treating it with magnesium oxide and barium carbonate, the magnesium oxide reacting with alkaline earth bicarbonates to form relatively insoluble alkaline earth carbonates in water, and reacting with alkali bicarbonates to form alkali carbonates and hydroxides, said barium carbonate reacting with alkaline earth sulphates to form barium sulphate and alkaline earth carbonates, and also reacting with alkali sulphates to form barium sulphate, and removing the relatively insoluble precipitates from the water.

9. The process of purifying water which consists in treating it with an alkaline earth carbonate in excess to form relatively insoluble alkaline earth sulphates and alkali carbonates and treating it with magnesium oxide in excess to react with the bicarbonates to form relatively insoluble carbonates.

10. The process of purifying water which consists in treating it in optional succession with milk of magnesia in excess to react with the bicarbonates to form relatively insoluble carbonates and with barium carbonate in excess to form relatively insoluble alkaline earth sulphates.

11. The process of purifying water which consists in treating it with milk of magnesia and barium carbonate, both in excess, and removing the precipitates.

12. The process of purifying water which consists in removing the acid radical of all the sulphate salts in the water, decomposing the bicarbonates in the water and removing substantially all the carbonates by treating with barium carbonate and milk of magnesia and removing the precipitates formed.

13. The process of purifying water which consists in removing from the water the salts of heavy metals and the sulphates by treating the water with an oxide and with an alkaline earth carbonate and removing the precipitates formed.

14. The process of purifying water for boilers and the like which consists in treating it with magnesium oxide and barium carbonate to react with the bicarbonates and sulphates in solution, forming relatively insoluble alkaline earth carbonates and sulphates and filtering the water to remove the precipitates and suspended matter, whereby substantially all the scale forming compounds are removed.

In testimony whereof, I hereunto affix my signature.

ALFRED N. FINN.

---

Certificate of Correction.

It is hereby certified that in Letters Patent No. 1,547,111, granted July 21, 1925, upon the application of Alfred N. Finn, of Washington, District of Columbia, for an improvement in " Water Purification," an error appears in the printed specification requiring correction as follows: Page 3, line 40, claim 8, strike out the words " in water " and line 41, after the word " bicarbonates " insert the words *in the water;* and that the said Letters Patent should be read with this correction therein that the same may conform to the record of the case in the Patent Office.

Signed and sealed this 22d day of September, A. D. 1925.

[SEAL.]

KARL FENNING,
*Acting Commissioner of Patents.*

Certificate of Correction.

It is hereby certified that in Letters Patent No. 1,547,111, granted July 21, 1925, upon the application of Alfred N. Finn, of Washington, District of Columbia, for an improvement in "Water Purification;" an error appears in the printed specification requiring correction as follows: Page 3, line 40, claim 8, strike out the words "in water" and line 41, after the word "bicarbonates" insert the words *in the water;* and that the said Letters Patent should be read with this correction therein that the same may conform to the record of the case in the Patent Office.

Signed and sealed this 22d day of September, A. D. 1925.

[SEAL.]
KARL FENNING,
*Acting Commissioner of Patents.*